United States Patent
Watts et al.

[19]

[11] Patent Number: 6,129,037
[45] Date of Patent: Oct. 10, 2000

[54] BAKERY DOUGH FLOUR APPLICATOR

[75] Inventors: James L. Watts, Norcross; Sterrett P. Campbell, Dunwoody, both of Ga.

[73] Assignee: Camtech, L.L.C., Norcross, Ga.

[21] Appl. No.: 09/021,195

[22] Filed: Feb. 10, 1998

[51] Int. Cl.[7] .............................. A21C 9/04; B05C 5/00; B01D 51/00; B07D 4/00

[52] U.S. Cl. ................ 118/13; 24/309; 24/312; 24/620; 426/235; 426/237; 426/289; 426/496; 55/418; 209/31

[58] Field of Search .................. 118/13, 24, 620, 118/309, 312; 209/31; 55/293, 315, 337, 418; 426/289, 295, 296, 235, 236, 239, 496

[56] References Cited

U.S. PATENT DOCUMENTS

| | | | |
|---|---|---|---|
| 4,008,025 | 2/1977 | Campbell | 425/96 |
| 4,306,850 | 12/1981 | Cummins | 425/332 |
| 4,332,538 | 6/1982 | Campbell | 425/140 |
| 4,636,301 | 1/1987 | Laramore | 209/31 |
| 4,948,611 | 8/1990 | Cummins | 426/503 |
| 5,264,232 | 11/1993 | Campbell | 426/503 |
| 5,270,070 | 12/1993 | Campbell | 426/503 |
| 5,283,074 | 2/1994 | Campbell | 426/496 |
| 5,356,652 | 10/1994 | Campbell | 426/503 |

OTHER PUBLICATIONS

Kraus, M.N., "Classifying Pneumatic Conveying Requirements" Solids Handling, McGraw–Hill, New York, NY, pp. 147–157, 1981.

*Primary Examiner*—Laura Edwards
*Assistant Examiner*—J. A. Lorengo
*Attorney, Agent, or Firm*—Thomas, Kayden, Horstemeyer & Risley

[57] ABSTRACT

A bakery dough flour applicator 10 for applying flour 12 to a dough piece 22 as the dough piece 22 travels along a processing path 134 includes a hopper 32 for supplying flour 12 and a transfer assembly 54 for providing flour 12 from the hopper 32 to an aerator 34 which creates an airborne flow of flour 40. The airborne flow of flour 40 is delivered to the interior of an enclosure 130 disposed about the dough processing path 134 through a plurality of spray nozzles 44 which direct the airborne flow of flour 40 to a dough piece 22 travelling through the enclosure 130 along the processing path 134 so that flour 12 from the airborne flow 40 adheres to the exterior surface of the dough piece 22. Flour 12 that does not adhere to a dough piece 22 is collected and filtered and provided back to the hopper 32 for later use.

26 Claims, 14 Drawing Sheets

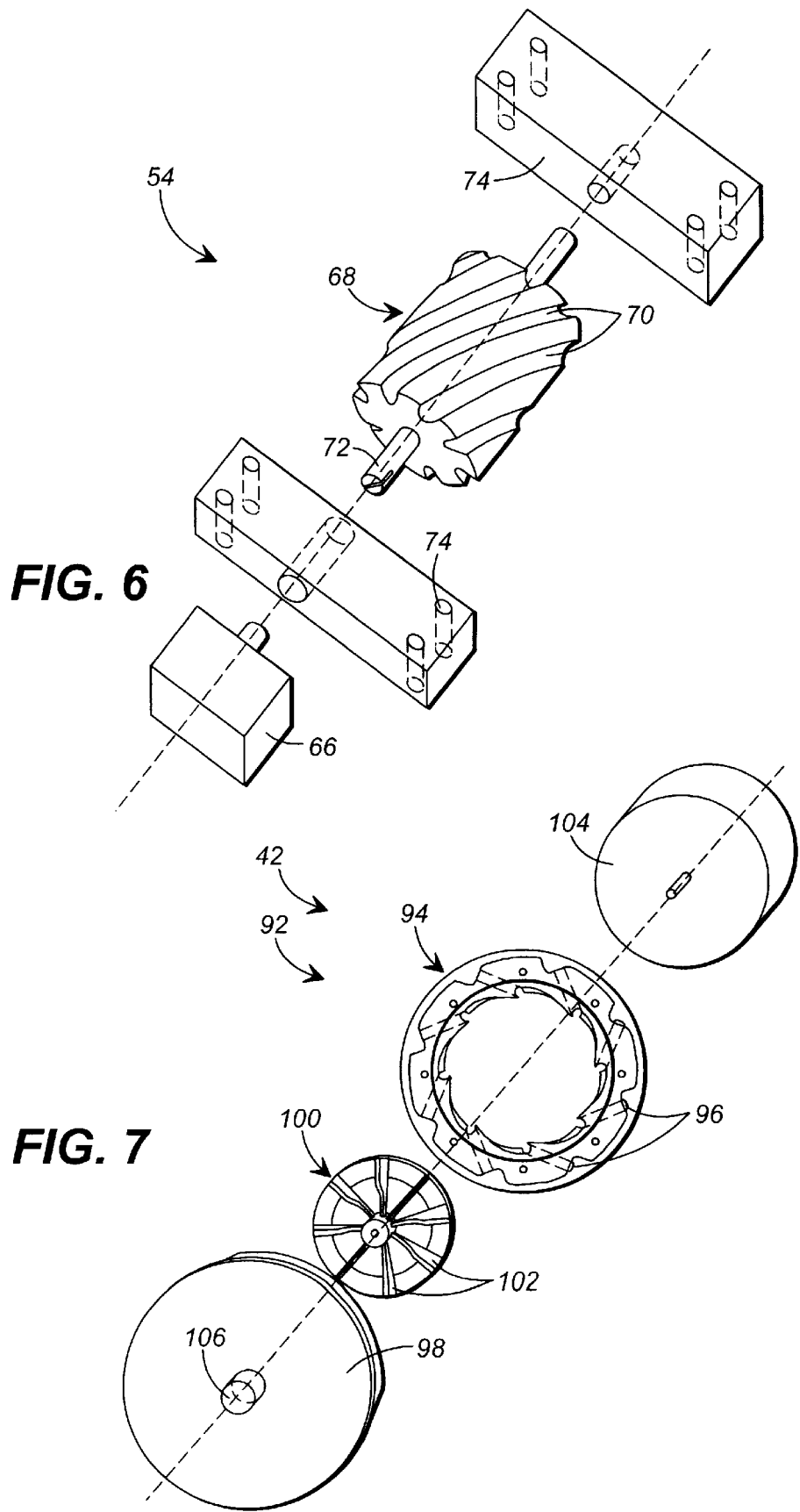

BAKERY DOUGH FLOUR APPLICATOR

FIELD OF THE INVENTION

The present invention relates to the handling of baker's dough in a bread making process. More specifically, the present invention relates to a device for applying flour to pieces of dough as the dough pieces move along a dough processing path.

DESCRIPTION OF THE PRIOR ART

In a commercial bread making process, the baker's dough, which is primarily made of flour and water, is blended in a large mixer. A particularly high water content is usually desirable in the dough composition formed in the mixer because a high water content tends to make a softer baked product and also reduces the cost of product manufacture because water, by volume, is a less expensive ingredient than flour. Gluten, which is a component of flour, absorbs and retains the water which is added to the mixer so that a dough of a sticky paste-like consistency is made.

After mixing, the sticky dough is then transferred to a stuffing pump which forms the dough into a stream or moving bar that passes through a conduit to dough processing equipment. The processing equipment can include, among others, a dough distribution manifold which distributes the stream of dough into multiple streams of dough, a dough divider which divides the dough streams into pieces of dough of equal weight and deposits the dough pieces on a surface conveyor having rounder bars suspended over the moving surface of the conveyor. The rounder bars shape and condition the surfaces of each of the dough pieces, making the dough pieces more spherical and developing the spherical surfaces. High water content dough, although having a sticky exterior surface, may be processed by equipment of this type for a short period of time without degrading dough production, however, there is typically a point during processing where the sticky dough adheres to the processing equipment and causes deformation of the dough pieces and ultimately can halt the production of the dough pieces by clogging or stopping up the dough processing path.

The standard in the bakery industry for preventing dough from sticking to objects such as dough processing equipment has been to apply raw flour to the exterior surface of dough pieces as they are being processed. Traditionally, applying flour has been accomplished by sifting flour onto the top of dough pieces as the dough pieces move along an automated processing path by sifting apparatus suspended over the processing path and working or kneading the flour into the surfaces of the dough pieces. Another method of applying flour to the exterior surface of dough pieces has been to apply flour to the interior surfaces of the dough processing equipment in order to provide a non-sticky physical barrier of flour between the dough pieces and the processing equipment that is manipulating the dough pieces and rolling the dough pieces against the flour until enough flour adheres to the dough pieces to produce non-sticky exterior dough surfaces on the dough pieces.

Once the stickiness of a dough piece has been reduced by flouring, changing the shape of the dough piece during processing can cause the stickiness of the exterior surface of the dough piece to return. For example, a dough piece in the form of a sphere as it emerges from the rounder bars has a given surface area which can be dramatically increased when the sphere of dough is manipulated by flattening the dough to form a disk such as for the manufacture of hamburger buns. This happens because as the dough is flattened, dough from the interior of the dough piece is displaced to the exterior surface, thereby increasing the exterior surface area, and therefore, potentially increasing the amount of sticky area contained on the exterior surface of the reshaped dough piece. Therefore, when a dough piece is floured to reduce exterior surface stickiness, it is desirable to apply enough flour to the dough piece so that the flour is of sufficient thickness and can stretch and reposition upon the surface of the processed dough piece in order to maintain the non-sticky integrity of the increased exterior surface area.

The development of higher speed dough processing machines where dough pieces move very rapidly along a processing path makes it more difficult to deliver and apply a sufficient amount of flour to the dough pieces as they move along the processing path in order to prevent the deformation of uniformly processed dough pieces or the sticking or clogging of dough pieces in the processing machines. Because of the difficulty in sprinkling a sufficient amount of flour on the dough pieces, a prior art dough processing system includes the step of rolling the dough pieces in a bed of flour during processing. This method involves the use of a sifter which drops flour over a downwardly inclined bed of the processing path over which the dough pieces will travel and a set of alternately angled diagonal side walls which form chutes known as a zigzag. The zigzag tends to turn the spherical dough pieces from side-to-side as the dough pieces roll down the zigzag paths and expose the entire exterior surface of a rolling dough piece to the falling sifted flour dispensed from above the processing path and to the bed of flour formed below the sifting apparatus, by forcing the dough piece to roll down the processing path about numerous axes as the dough piece contacts the side walls of the zigzag chutes. Zigzags also can incorporate vibrators which tend to "flow" the flour about the processing paths as well as promote the rotation of the dough pieces about random axes, thereby more thoroughly exposing the exterior surfaces of the dough pieces to the flour. The zigzag processing method has, however, led to problems including non-uniformly decelerating the dough pieces which tends to cause the dough pieces to move out of timed relationship with the rest of the processing equipment, and possibly jam the equipment. Due to the high operating speeds of modern dough processing machines, even one jammed dough piece can cause a significant disruption in the output of the processing equipment by initiating a buildup of more jammed dough pieces upstream in the production process.

In an effort to improve bakery dough production efficiency by ensuring that dough pieces do not possess sticky exterior surface characteristics during processing, flouring processes utilize a large amount of flour. As a result, the space surrounding dough processing paths, including the atmosphere, the floor, the walls, and the adjacent processing equipment, contain a significant amount of unused, and therefore, wasted flour. To reduce the amount of wasted flour, flour collection systems have been adapted to recapture unused flour and reintroduce the flour to the bakery dough manufacturing process. Several prior art systems accomplish this task, however, these collection systems have done little to reduce the inherent production inefficiencies caused by dough pieces jamming or clogging in dough processing equipment. Therefore, there is a need to provide an improved flour collection and application system that does not require the use of prior art dough flouring systems, such as zigzags, that potentially reduce production efficiency by causing dough pieces to jam in the processing equipment.

Additionally, there is a need to apply a sufficient amount of flour to dough pieces as they move rapidly along an automated processing path to ensure that the exterior surfaces of the dough pieces maintain the characteristic of non-stickiness during processing while minimizing the amount of wasted flour.

Further, it would be desirable to increase bakery dough production efficiency by applying the flour directly to a dough piece in order to limit the amount of flour used during the application process while utilizing a collection system that recaptures unused flour at specific locations throughout the production process.

SUMMARY OF THE INVENTION

Briefly described, the present invention comprises an improved apparatus and method for applying flour to dough pieces moving along a processing path. The apparatus includes a flour supply hopper, a dough piece processing path, an open ended flour applicator enclosure straddling the processing path having a series of flour spray nozzles, and a flour delivery and collection system. The flour delivery and collection system draws flour from the flour supply hopper and delivers airborne flour to the open ended flour applicator enclosure and then returns the unused flour from the enclosure back to the supply hopper. The present invention replaces a traditional series of flour sifters, vibrators, conveyors and zigzags used to flour the exterior surfaces of dough pieces as the dough pieces travel along a processing path, which tends to reduce the jamming or clogging of dough pieces in the processing equipment, so that a more efficient dough production process is created.

The flour supply reservoir or hopper provides a source of flour by means of a transfer assembly to an aeration unit which mixes a predetermined amount of flour with a preset flow of air provided by an auxiliary blower. The airborne flour stream created by the aeration unit is then routed through a distribution network which delivers the stream of airborne flour to an enclosure mounted on the dough processing path. The airborne flour enters the open ended flour applicator enclosure through a series of spray nozzles which direct the flow of airborne flour toward the path of the dough pieces passing along a portion of the processing path which can take the form of a surface conveyor or a downwardly inclined ramp within the enclosure. The spray nozzles form a cloud or turbulence of airborne flour in the environment of the dough pieces which is confined by the interior surfaces of the flour applicator enclosure and the processing path. The airborne flour forming the turbulence adheres to the sticky exterior surfaces of passing dough pieces and also tends to coat the surfaces of the processing equipment exposed within the enclosure, such as the enclosure interior side walls and the ramp. This coating of the surfaces of the enclosure is enhanced by a static charge which builds up in the flour as the airborne flour passes through non-conductive delivery conduits which form the airborne flour delivery and collection system.

The collection system is integrated with the enclosure so that the sprayed airborne flour is prevented from escaping the enclosure and is recaptured. This is accomplished by incorporating a main blower which provides a reduced air pressure or suction to a collection orifice which is placed above the processing path so that a sufficient drawing of air is created within the enclosure to recapture flour that does not adhere to a surface within the enclosure. It should be noted that the enclosure is not airtight, therefore, a recapture airflow rate of approximately 200 ft/min through each enclosure opening is established to prevent flour from exiting the enclosure at an enclosure opening other than the collection orifice. For example, if the enclosure incorporates an inlet with an area of 1 ft$^2$, an outlet with an area of 1 ft$^2$ and miscellaneous openings about the base of the enclosure totaling an area of 0.5 ft$^2$, a recapture airflow configured to maintain the flour from exiting the enclosure (200 ft/min flow) would require a volumetric flow of 500 ft$^3$/min ((1 ft$^2$+1 ft$^2$+0.5 ft$^2$)×200 ft/min)) provided by the collection system to the enclosure. Additionally, it is often desirable to provide a sufficient recapture airflow rate to allow for the collection of flour that is situated outside and adjacent an enclosure opening. A recapture airflow rate of approximately 400 ft/min per enclosure opening has been found sufficient to draw the flour into the opening and provide the flour to the collection system. Movable curtains can be suspended at the inlet and outlet of the open ended flour applicator enclosure to retard movement of flour out of the enclosure and to otherwise reduce the operative area of the openings, thereby reducing the recapture airflow requirements of the collection system.

The flour applicator enclosure also can be adapted for use about a processing surface conveyor which transports dough pieces along a segment of dough processing path. Since the surface conveyor can be arranged in a substantially horizontal orientation, suspended curtains can be used to restrict the open ends of the enclosure at the points of dough piece ingress and egress, thereby reducing the amount of air inlet area to the enclosure. By reducing the amount of air inlet area, a reduced level of suction is required to maintain the predetermined recapture airflow rate necessary to contain the airborne flour within the enclosure prior to its collection. In the surface conveyor mounted configuration, the collection orifices are contained within collection funnels mounted below each end of the conveyor, such that collection of the unused flour is not only induced by the suction created by the recapture airflow departing the enclosure through the orifices, but by the tendency of the flour adhering to the conveyor belt to fall free of the conveyor as the direction of belt travel is changed as the belt is turned around a conveyor pulley at each end of the conveyor by a motor. Once the flour enters a collection orifice, the flour is provided to a series of collection conduits for ultimate return to the flour hopper. Additionally, when the supply of flour in the hopper drops below a predetermined level, it can be augmented by adding flour through a supply valve positioned in a segment of collection conduit between the collection orifices and a flour filtration system.

Once in the collection conduit, the airborne flour travels to the filtration system which includes a drop-out box, which provides a two step filtering process by forcing the airborne flour through an inlet and then downwardly and upwardly past a vertically disposed internal barrier wall, and then forcing the airborne flour through a screen filter before exiting the drop-out box outlet. When the airborne flour is forced to change direction around the lower end of the internal barrier wall, heavier particles such as small pieces of dough fall out of the recapture airflow and into a particle collection tray at the bottom of the drop-out box which is hinged so that the tray may be lowered and the particles trapped therein can be removed. Additionally, the screen filter removes particles larger than flour from the collection airflow and can also be removed and cleaned by accessing the screen through the opening formed when the collection tray is lowered for cleaning. After exiting the drop-out box, the airborne flour passes into an air-flour separator where the airborne flour is separated from the fast moving air. After separation, the air moves to the inlet of the main blower and is vented to atmosphere and the flour is placed back in the hopper for return to the delivery system.

Therefore, it is an object of the present invention to provide an improved device for flouring dough pieces moving along an automated processing path, which aerates a supply of flour and sprays the airborne flour directly on the exterior surface of each dough piece.

It is another object of the invention to provide an improved device for flouring a dough piece that incorporates flour spraying nozzles in an enclosed area so that a turbulently floured space is formed by the spray nozzles and is contained in the enclosure, thereby limiting the locations of flour recapture points for collecting the unused sprayed flour to locations at or adjacent the enclosure.

It is yet another object of the invention to provide an improved device for flouring rapidly moving dough pieces that eliminates the need for prior art dough piece production components.

Another object of the invention is to provide a method of applying flour to bakery dough pieces moving along a processing path by forming a turbulence of air and flour about the dough pieces as they move along the processing path.

Other objects, features and advantages of the present invention will become apparent upon reading the following specification, when taken in conjunction with the accompanying drawings.

BRIEF DESCRIPTION OF THE DRAWINGS

The accompanying drawings incorporated in and forming a part of the specification illustrate several aspects of the present inventions, and together with the description serve to explain the principles of the inventions. The components in the drawings are not necessarily to scale, emphasis instead being placed upon clearly illustrating principles of the present inventions.

FIG. 6 illustrates a perspective view of the transfer assembly

FIG. 7 illustrates an exploded view of the flow divider.

Figure 1:
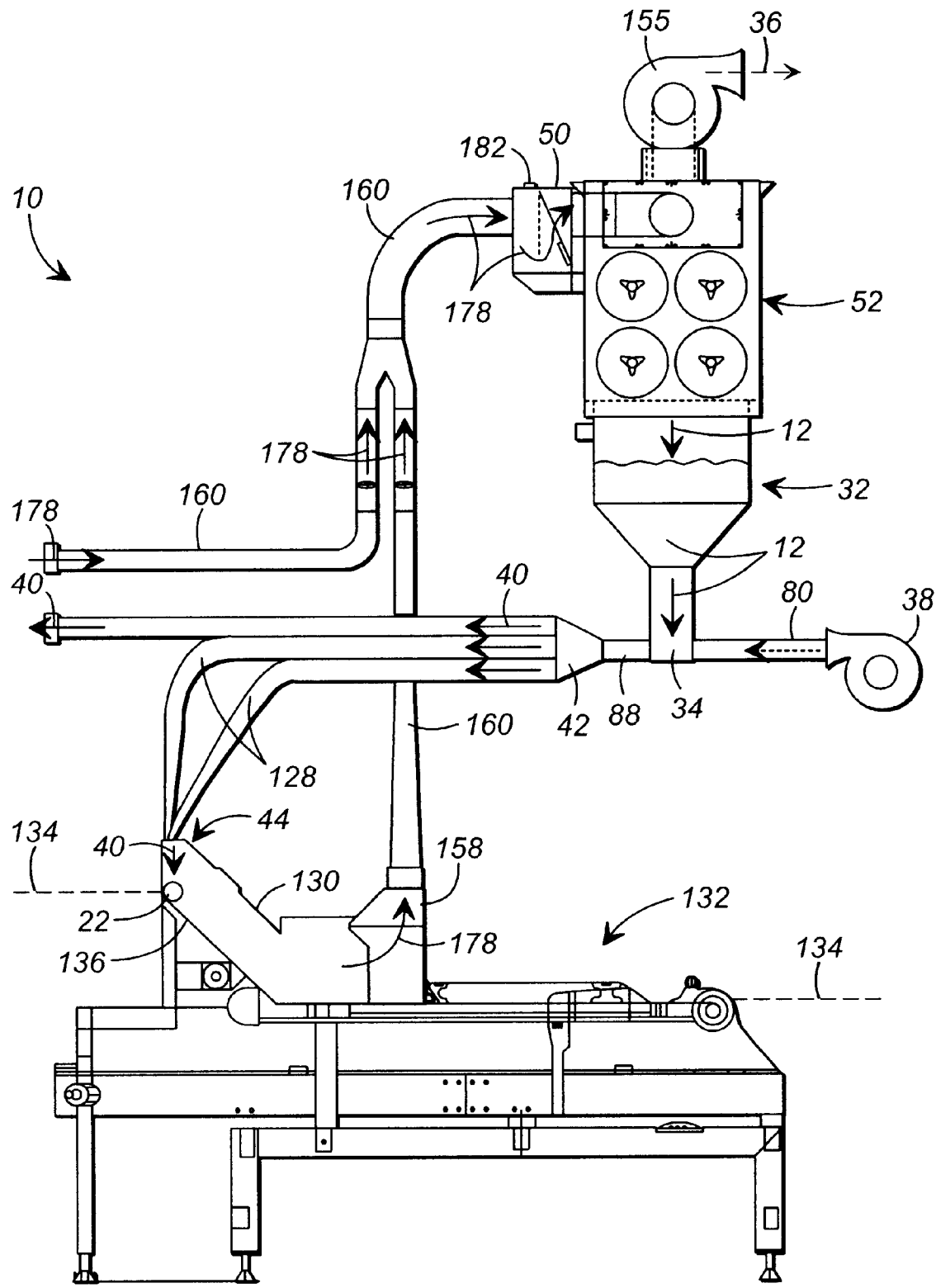
FIG. 1 illustrates a schematic diagram of the present invention.
Figure 2A:
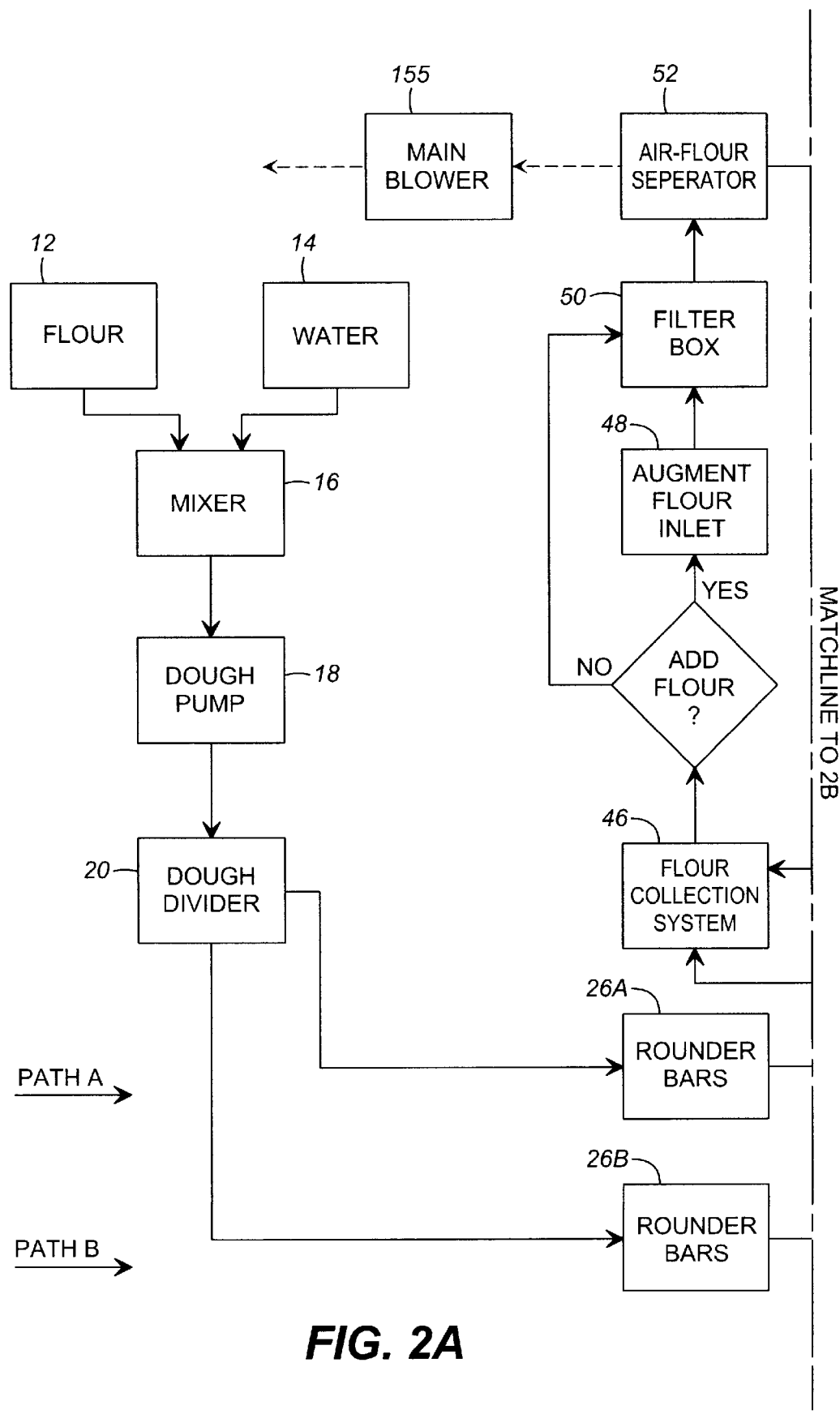
FIGS. 2A & 2B illustrate a elevation of an embodiment of the invention.
Figure 2B:
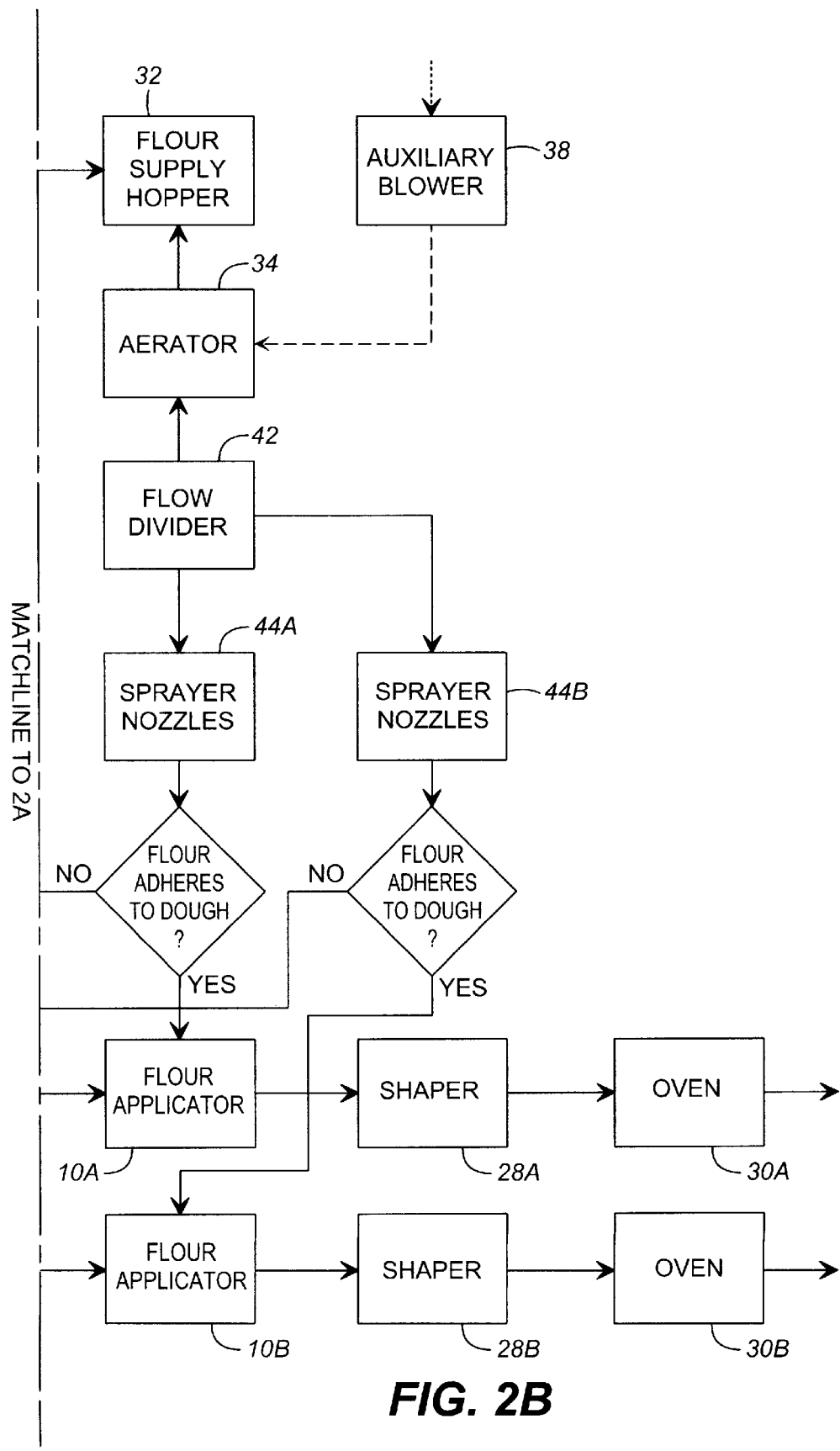

DETAILED DESCRIPTION OF THE PREFERRED EMBODIMENTS

Reference will now be made in detail to the description of the invention as illustrated in the drawings with like numerals indicating like parts throughout the several views. A bakery dough flour applicator 10 and method for its use, as shown in FIGS. 1 and 2 respectively, are used for applying flour to the exterior surfaces of dough pieces in order to minimize the stickiness of the exterior surfaces of the dough pieces, so that the dough will have a reduced tendency to stick to processing equipment and otherwise become deformed.

As shown in FIG. 2, the method for using the bakery dough flour applicator 10 includes providing a supply of flour 12 and a supply of water 14 and then mixing the flour 12 and water 14 in a mixer 16 to form dough. The dough is then pumped in a stuffing pump 18 and is formed by the pump 18 into a bar or stream of moving dough and is sent to a dough divider 20 where the dough stream is divided into multiple streams and then sent to multiple processing paths. A and B. While only two processing paths A and B are illustrated, it should be understood that the divider 20 can form more than two paths of dough. Prior art stuffing pumps and dividers are disclosed in U.S. Pat. Nos. 4,332,538, 4,948,611, 5,264,232, 5,270,070 and 5,283,074. While in either path A or B, the dough is cut into pieces 22 by the divider 20 and the dough pieces 22 fall to the surface conveyor 24 of a rounder bar system 26A or 26B. Prior art rounder bar systems are disclosed in U.S. Pat. Nos. 5,270.070, 4,306,850, and 4,008,025 After being rounded, the dough pieces 22 move through the flour applicator 10A or 10B, are shaped by shapers 28A or 28B, such as sheeter-moulder-panners, and are transported further along the processing paths A or B for baking in ovens 30A or 30B.

The method of dough piece flouring with applicator 10 includes the steps of providing a supply of flour 12 from a hopper 32 and aerating the flour 12 in an aerator 34 with a supply of air 36 provided by an auxiliary blower 38 so that a flow of airborne flour 40 is created. The flow of airborne flour 40 can be divided in a flow divider 42 and sent to multiple sprayer nozzles 44A or 44B, among others. The airborne flour 40 is then sprayed from the nozzles 44A or 44B at the dough pieces 22, where the airborne flour 40 either sticks to a dough piece 22 or another surface, or remains airborne in the flow of air 36. Flour 12 that remains airborne is collected by a flour collection system 46 and a determination is made as to whether additional flour 12 must be added to the airborne flour 40 in order to increase the supply of flour 12 in the system. The airborne flour 40, including any flour 12 added the system through a flour augment inlet 48, is then filtered in a drop-out filter box 50 and separated by an air-flour separator 52 into its constituent parts of air 36 and flour 12. The flour 12 can then be returned to the flour supply hopper 32 for reuse.

Figure 3:
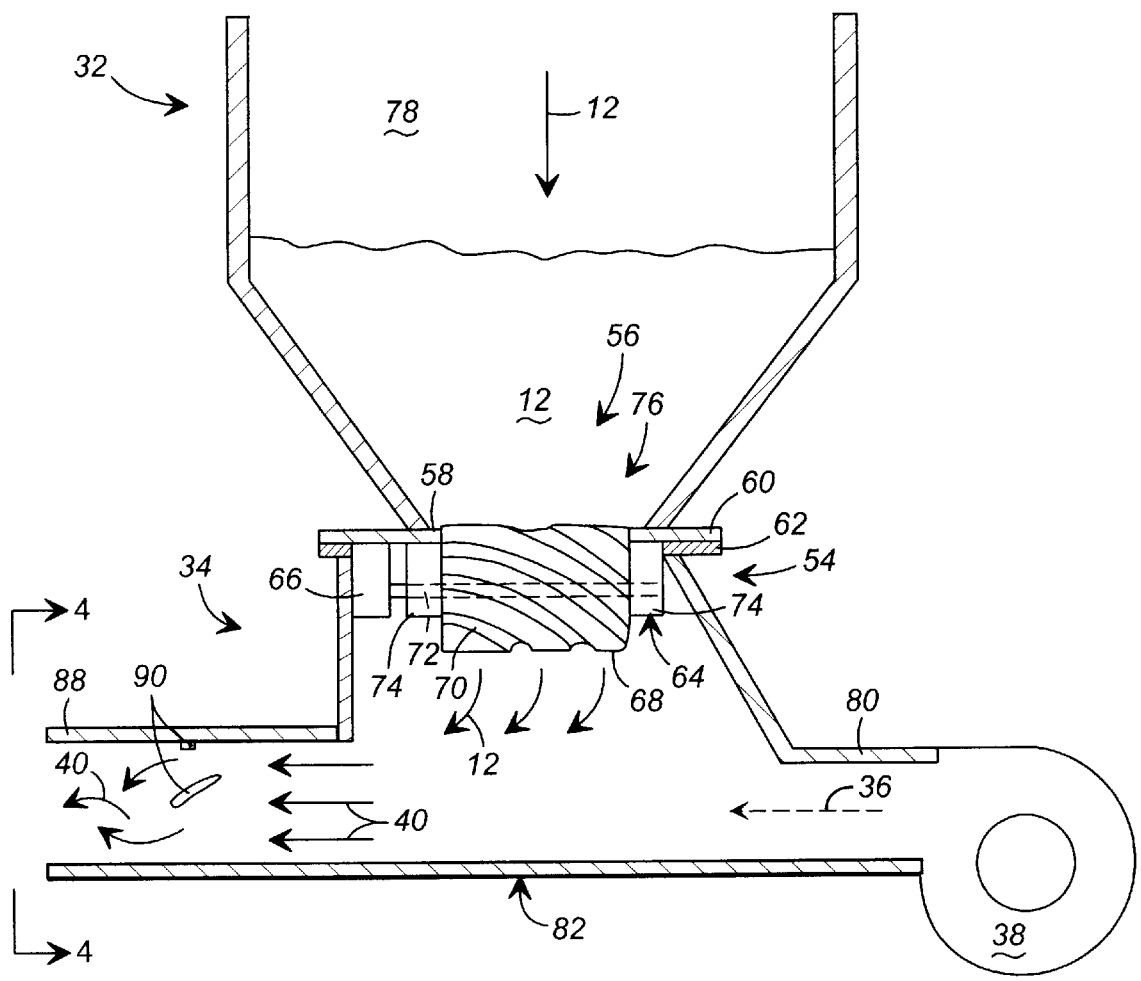
FIG. 3 illustrates detail of the hopper, transfer assembly and aeration unit.
Figure 4:
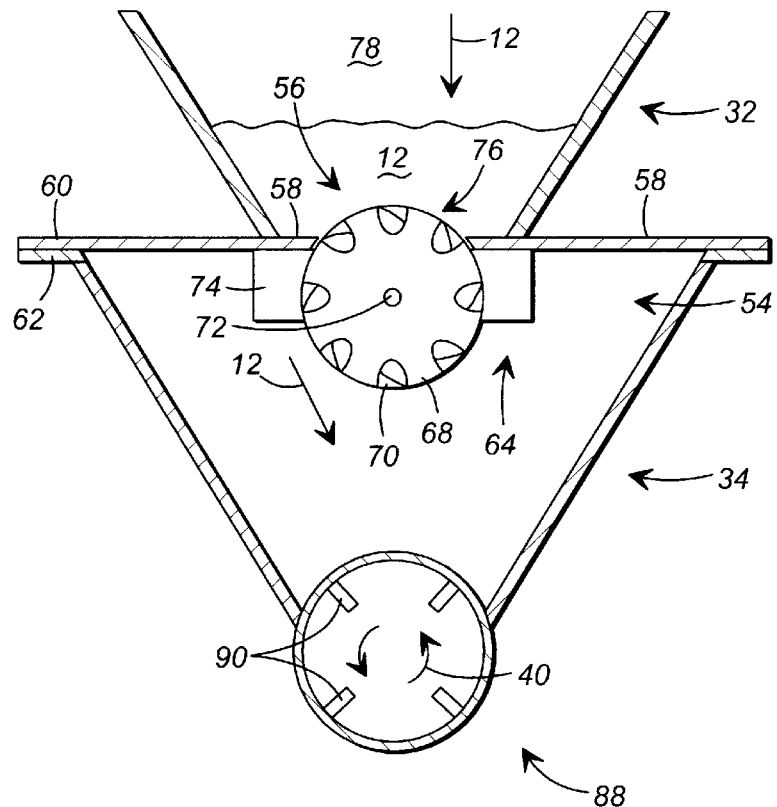
FIG. 4 illustrates a cross-sectional end view of the hopper, transfer assembly and aeration unit.
Figure 5:
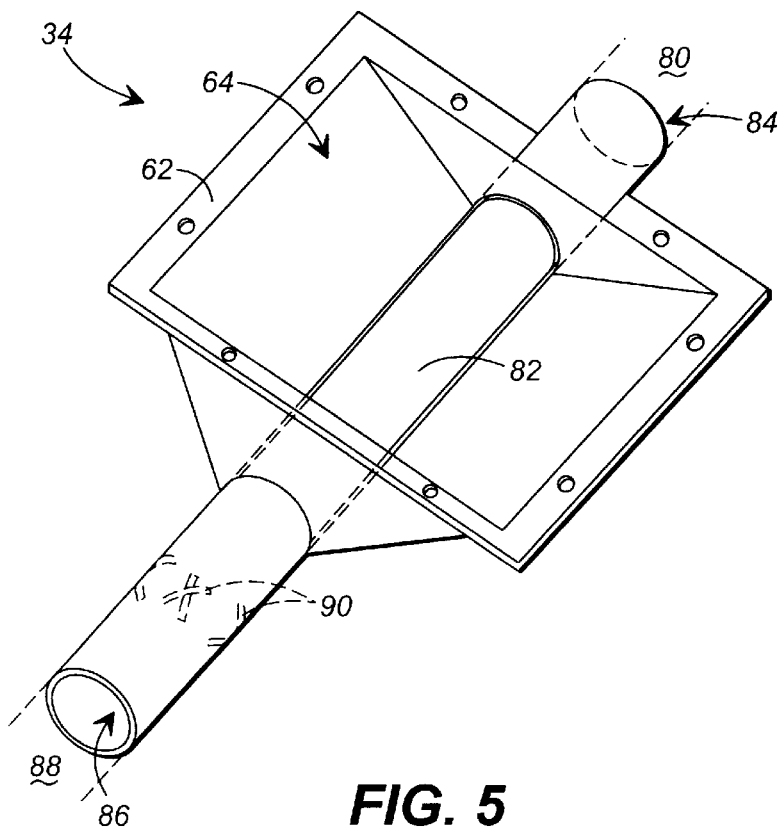
FIG. 5 illustrates a perspective view of the aeration unit.

As shown in FIGS. 1, 3 and 4, a flour supply hopper 32 provides a source of flour 12 to an aerator 34 by a transfer assembly 54 which functions as a flour dispensing means. The hopper 32 has a flour outlet 56 defined by a base plate 58 which includes an outlet flange 60 about the outer periphery of the base plate 58. The hopper outlet flange 60 couples to an inlet flange 62 disposed about a flour inlet 64 of the aerator 34 (FIG. 5). The aerator 34 houses the transfer assembly 54 (FIG. 6) which includes a motor 66 for driving a cylindrical drum 68 having a set of external helical grooves 70. As shown in FIGS. 3 and 4, the drum 68 is mounted to an axle 72 which orients the longitudinal axis of the drum 68 substantially horizontally within the aerator 34. Bearings 74 fasten to the base plate 58 of the hopper 32 and support the axle 72 and drum 68 in the horizontal orientation. An upper portion 76 of the drum 68 protrudes upwardly and outwardly from the inlet 64 of the aerator 34 and into the outlet 56 of the hopper 32 positioned thereabove. The outlet 56 is configured to receive the drum 68 so that flour 12 is permitted to flow from the hopper 32 when the drum 68 is rotated by means of the incorporated motor 66. Additionally, the upper portion 76 of the drum 68 disposed within the hopper outlet 56 is arranged to maintain the integrity of a vacuum 78 contained within the hopper 32 which will be discussed in detail hereinafter.

When the motor 66 rotates the drum 68 in direction A (FIG. 4), the helical grooves 70 enter the outlet 56 and contact the flour 12 piled at the bottom of the hopper 32. The rotating grooves 70 fill with flour 12, exit the hopper outlet 56 and reenter the aerator inlet 64 where the flour 12 is spilled from the grooves 70 and thereby dispensed into the aerator 34. Each groove 70, in turn repeats this process so that a continuous amount of flour 12 is transferred during operation of the transfer assembly 54. Additionally, the helical grooves 70 are configured so that both ends of a groove 70 can not simultaneously extend through the hopper outlet 56 while the groove 70 disposed between the ends is substantially contained within the hopper 32. In this manner, the amount of flour 12 entering the aerator 34 is limited to the amount of flour 12 contained within the grooves 70 of the drum 68 which rotate through the hopper 32 such that the amount of dispensed flour 12 is not supplemented by flour 12 pouring through both ends of a groove 70 which would otherwise be simultaneously exposed to the aerator inlet 64. Additionally, this groove configuration prevents air 36 from entering the hopper 32 through the transfer assembly 54 which could potentially corrupt the vacuum 78 contained within the hopper 32.

The aerator 34, which functions as an aerating means, aerates the flour 12 with a preset flow of air 36 provided by an auxiliary blower 38. The flow of air 36 is provided to the aerator 34 from the auxiliary blower 38 by a segment of air delivery conduit 80 which is incorporated into the bottom portion 82 of the aerator 34 forming an air inlet 84. Once the air 36 enters the aerator 34 through inlet 84, the air 36 mixes with the flour 12 falling from the grooves 70 of the transfer assembly 54. The flow of air 36 from the auxiliary blower 38 then forces the airborne flour 40 through an airborne flour outlet 86 and into a segment of airborne flour delivery conduit 88, which functions as a delivering means, which imparts a swirling motion to the airborne flour 40 by a series of stationary vanes 90 positioned in the delivery conduit 88. This swirling motion tends to keep the flour 12 evenly distributed around the radius of the delivery conduit 88 as the airborne flour 40 travels through the conduit 88 thereby reducing the tendency of the flour 12 to settle out of the flow of airborne flour 40 and collect at the bottom of the conduit 88.

Figure 8:
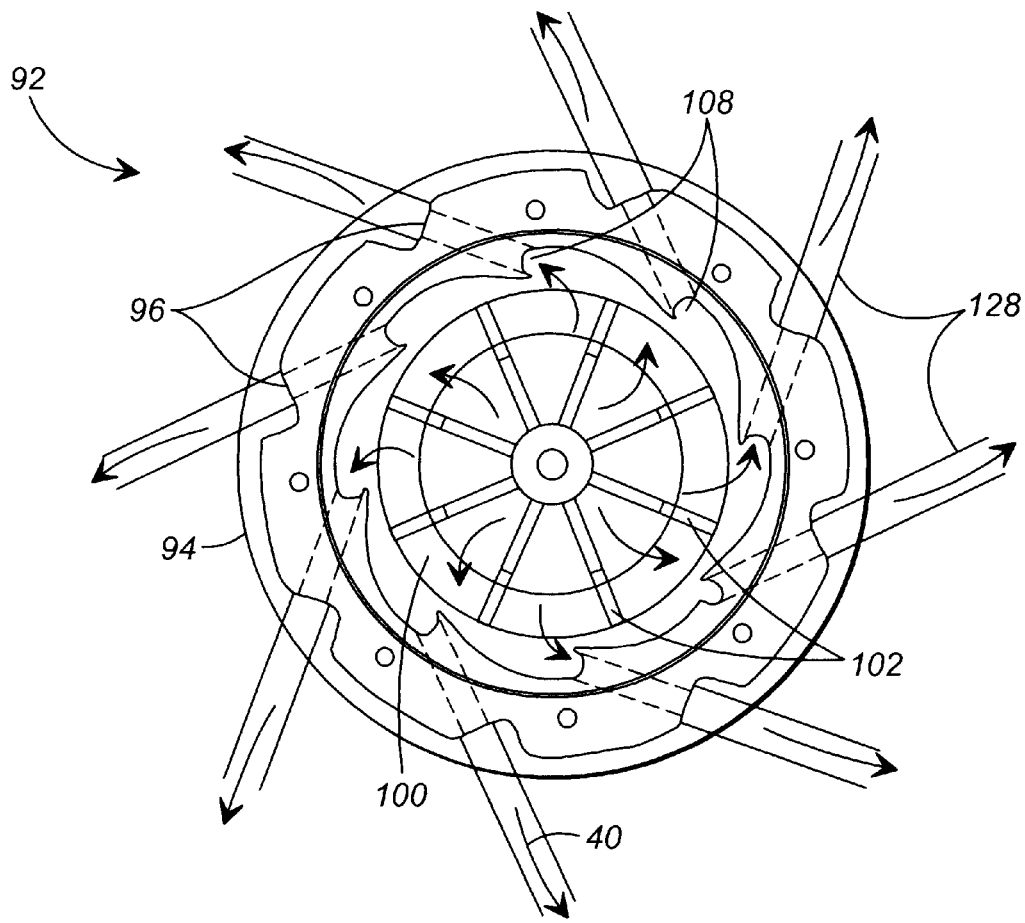
FIG. 8 illustrates a plan view of the flow divider.
Figure 9:
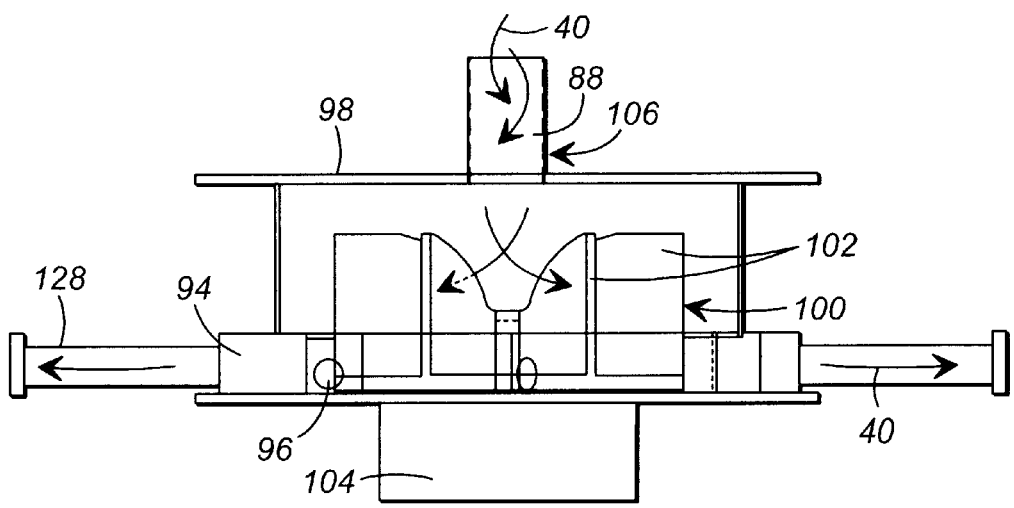
FIG. 9 illustrates a cross-sectional elevation of the flow divider.

Prior to applying the airborne flour 40 to a dough piece 17, the airborne flour 40 can be divided into multiple homogenized flows by a flow divider 42 which functions as divider means, so that an independent flow of airborne flour 40 is provided to each sprayer nozzle 44 In the preferred embodiment of the invention, a flow divider 42 in the form of a centrifugal impeller 92 (FIGS. 7, 8 and 9) is used to separate the airborne flow into a predetermined number of flows of airborne flour 40. The impeller 92 includes a stator 94 having a plurality of flow outlets 96, a casing 98 which encloses a rotor 100 having a plurality of blades 102 and centrally mounted to the stator 94, and a base 104 which supports the stator 94, casing 98 and rotor 100. The delivery conduit 88 provides a flow of swirling airborne flour 40 to the inlet 106 of the flow divider 42 which is located in the casing 98 above the center of the rotor 100. The swirling flow imparts a rotation to the rotor 100 as the airborne flour 40 impinges upon the blades 102 such that the rotor 100 and the airborne flour 40 rotate within the impeller casing 98 thereby tending to further homogenize the airborne flour 40. Centrifugal force urges the airborne flour 40 tangentially outwardly from the rotor 100 such that the airborne flour 40 exits the impeller 92 through the series of outlets 96 equally spaced and radially disposed about the periphery of the stator 94. Additionally, the stator 94 incorporates a shaped recess 108 interiorly adjacent each outlet 96 which directs the swirling airborne flour 40 toward the outlets 96 so that multiple independent and homogenized flows of airborne flour 40 are created which tangentially depart the flow divider 42. The impeller 92 also can incorporate a motor 109 (not shown) to drive rotor 100, in a known conventional manner, so that the delivery pressure of the airborne flour 40 departing the impeller 92 can be stabilized and increased. This driven-rotor configuration would tend to alleviate fluctuations in airborne flour 40 delivery rates caused by fluctuations in air delivery rates provided by the auxiliary blower 38.

Figures 10, 11:
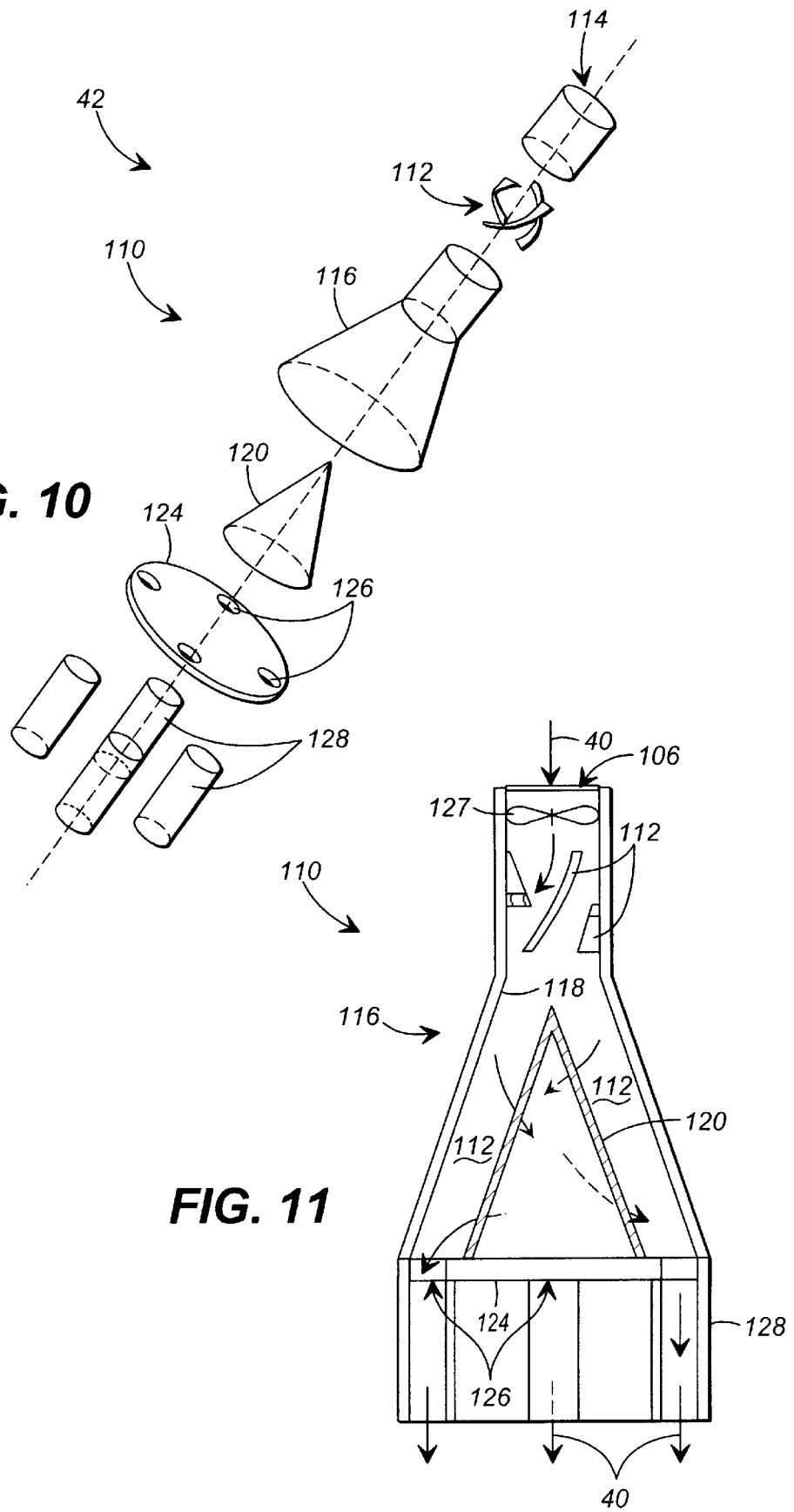
FIG. 10 illustrates an exploded view of an alternative embodiment of the flow divider.
FIG. 11 illustrates a cross-sectional elevation of an alternative embodiment of the flow divider

As shown in FIGS. 10 and 11, an alternative embodiment of the flow divider 42 uses a static flow divider 110 to separate flows of the airborne flour 40 which incorporates a series of stationary internal swirling vanes 112. The airborne flour 40 enters the inlet 114 of the static divider 110 and then impinges the vanes 112 which impart the swirling motion to the airborne flour 40 thereby tending to force the airborne flour 40 radially outwardly within the interior of the static divider 110. The airborne flour 40 then enters the body 116 of the divider 110 which has an exterior wall 118 shaped as an inverted funnel and an interior wall 120 shaped as an inverted cone such that the airborne flour 40 flows through the body 116 while swirling around a conically shaped flow path 122. The airborne flour 40 is divided as it passes through a base plate 124 which mounts to the bottom of the body 116 having a series of outlets 126 equally distributed along the plate 124 about the flow path 122. It should be noted that the embodiments of the flow dividers 42 can be modified to produce fewer flows of airborne flour 40 by blocking divider outlets 96 and 126 so that a single divider 42 can be adapted to a variety of dough processing configurations.

Figure 12:
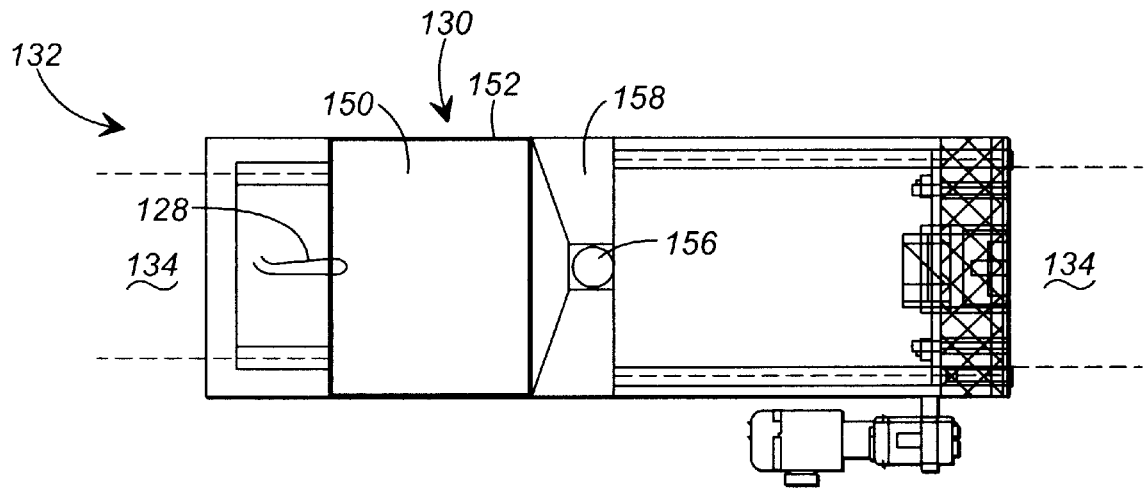
FIG. 12 illustrates a plan view of a processing path incorporating an enclosure positioned above an angled ramp.
Figure 13:
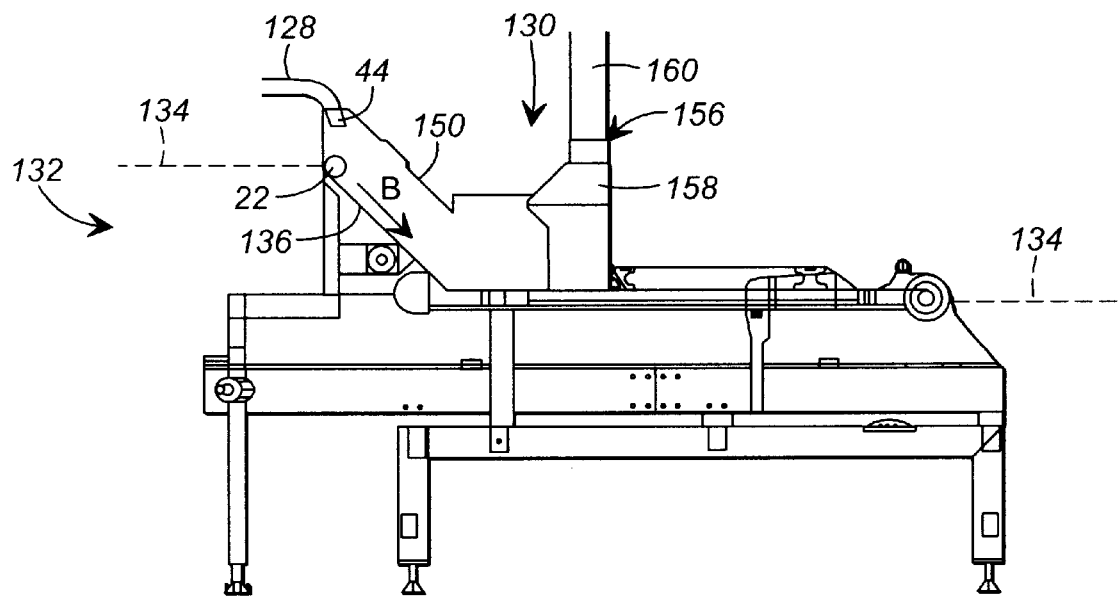
FIG. 13 illustrates an elevation of a processing path incorporating an enclosure positioned above an angled ramp.
Figure 14:
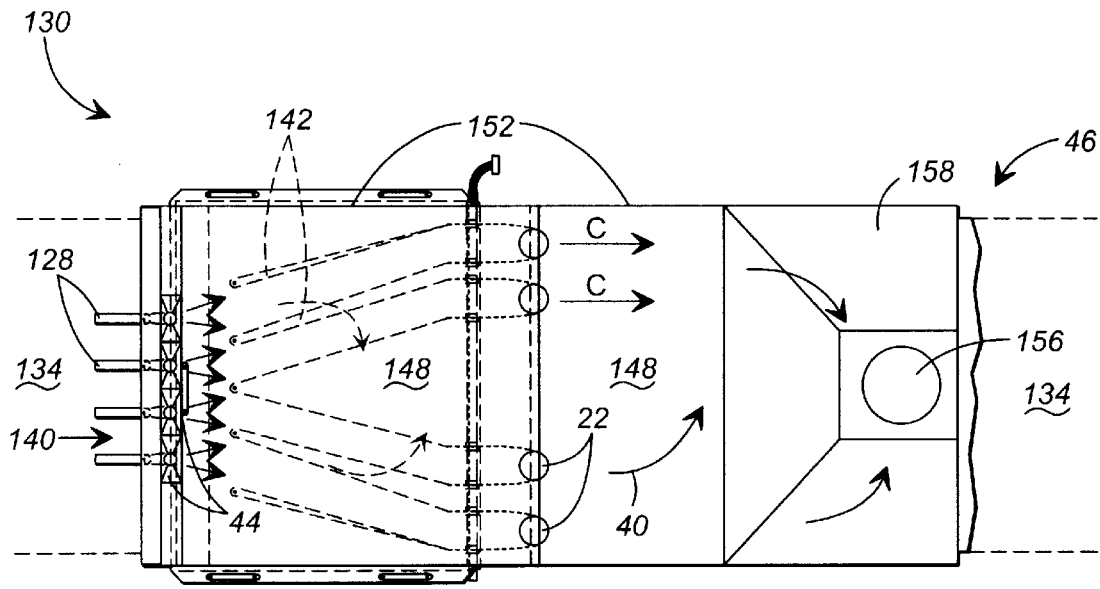
FIG. 14 illustrates a plan view showing detail of the ramp enclosure.
Figure 15:
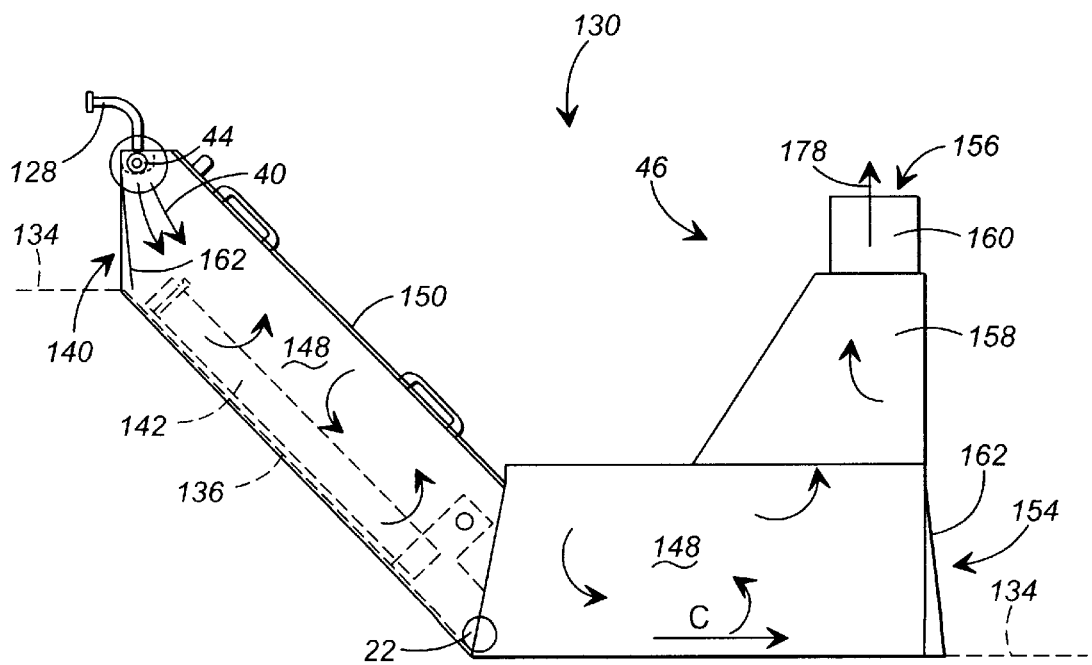
FIG. 15 illustrates a cross-sectional elevation showing detail of the ramp enclosure.
Figure 16:
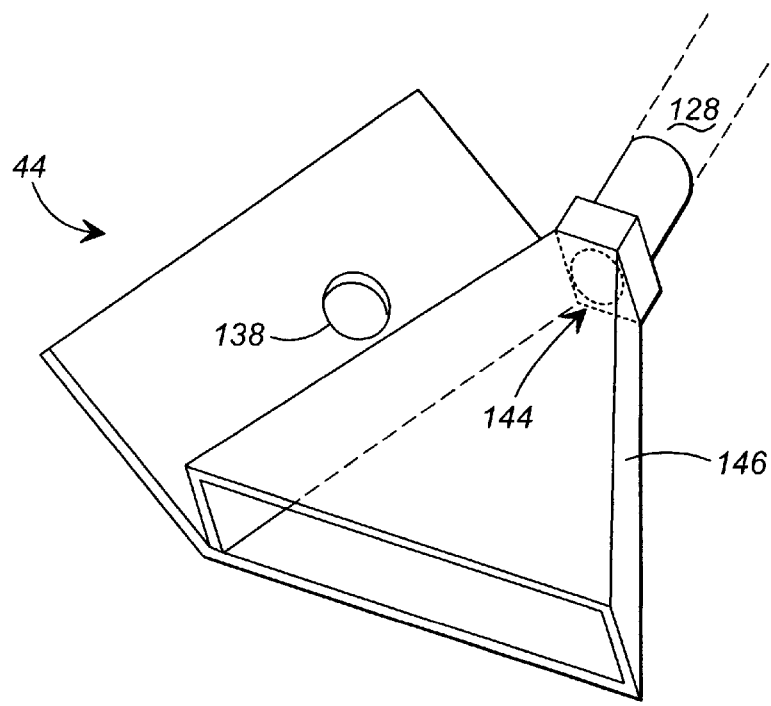
FIG. 16 illustrates a perspective view of a spray nozzle.
Figure 17:
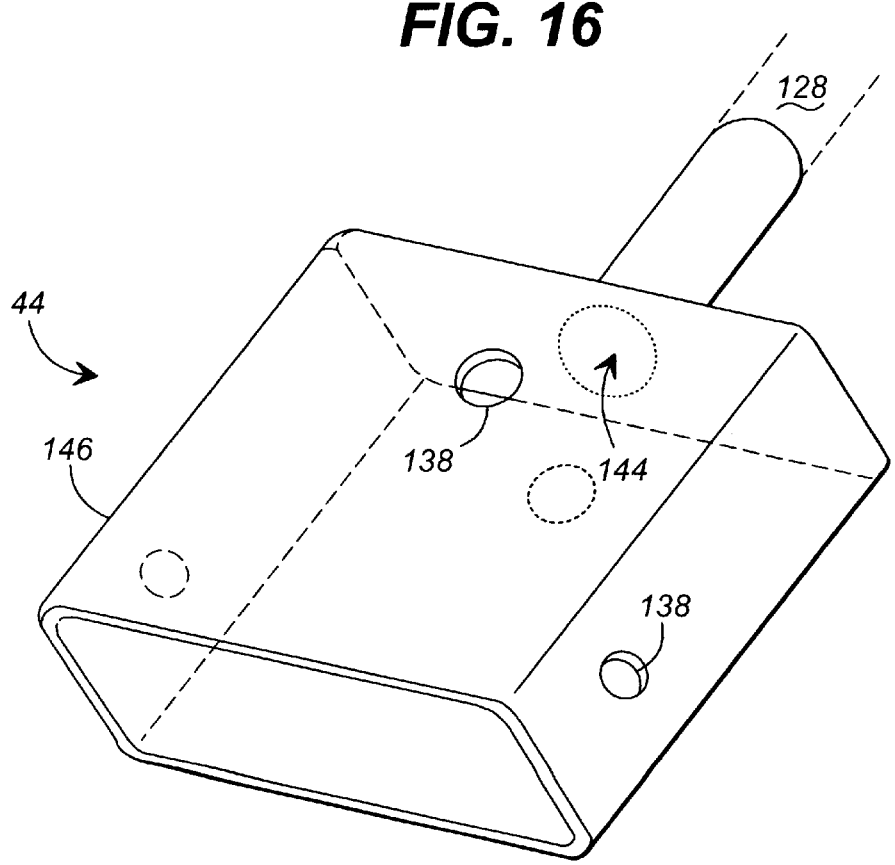
FIG. 17 illustrates a perspective view of an alternative embodiment of a spray nozzle.
Figure 18:
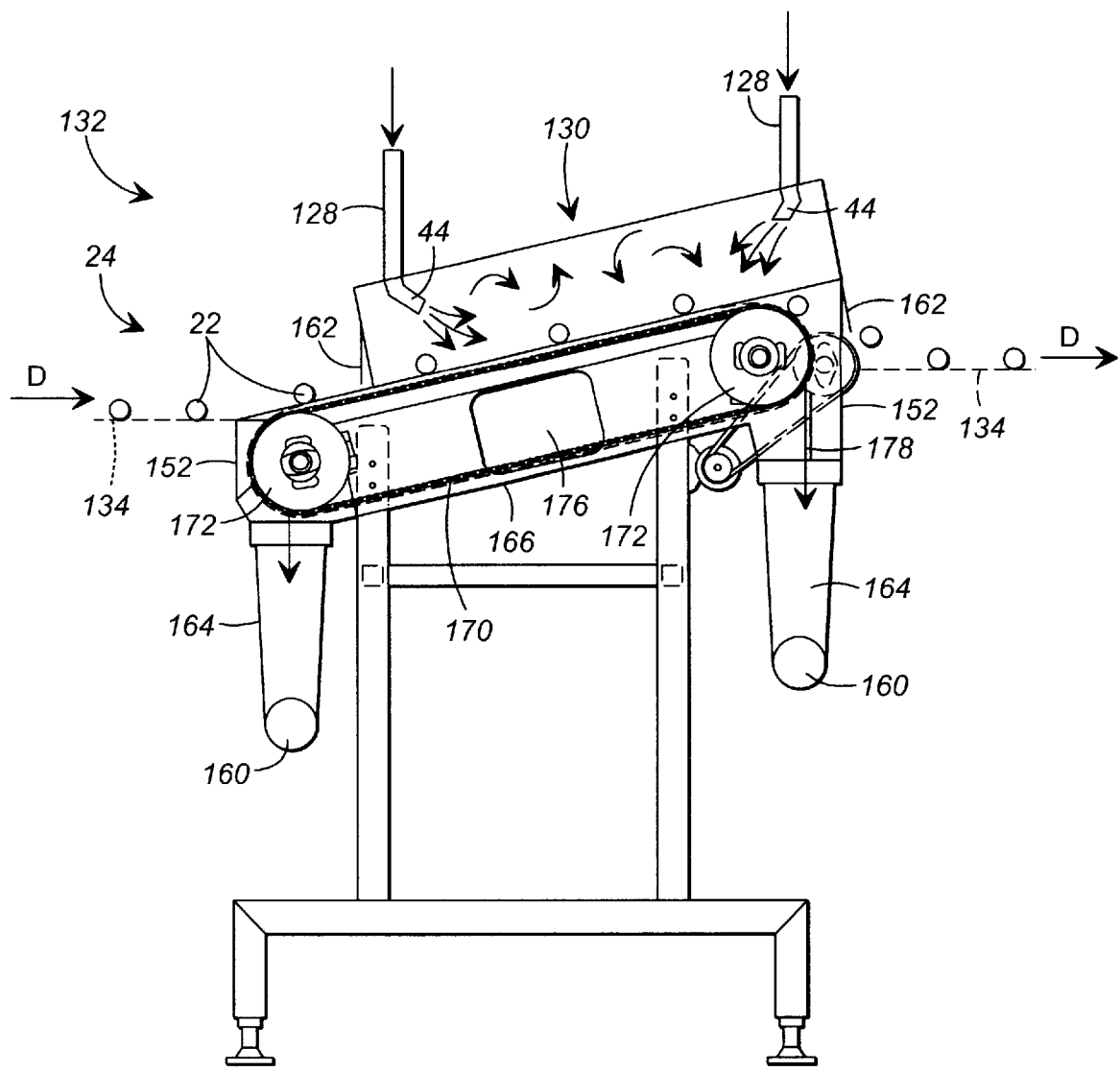
FIG. 18 illustrates a cross-sectional elevation of a processing path incorporating an enclosure mounted above a conveyor.
Figure 19:
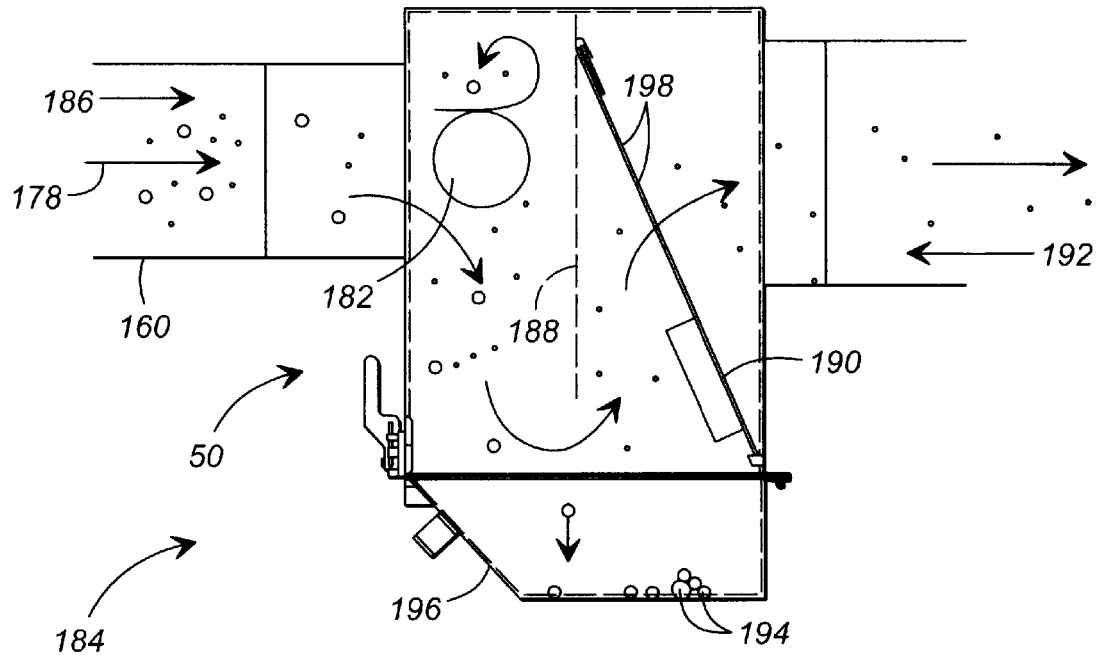
FIG. 19 illustrates a cross-sectional elevation of a dropout box.
Figure 20:
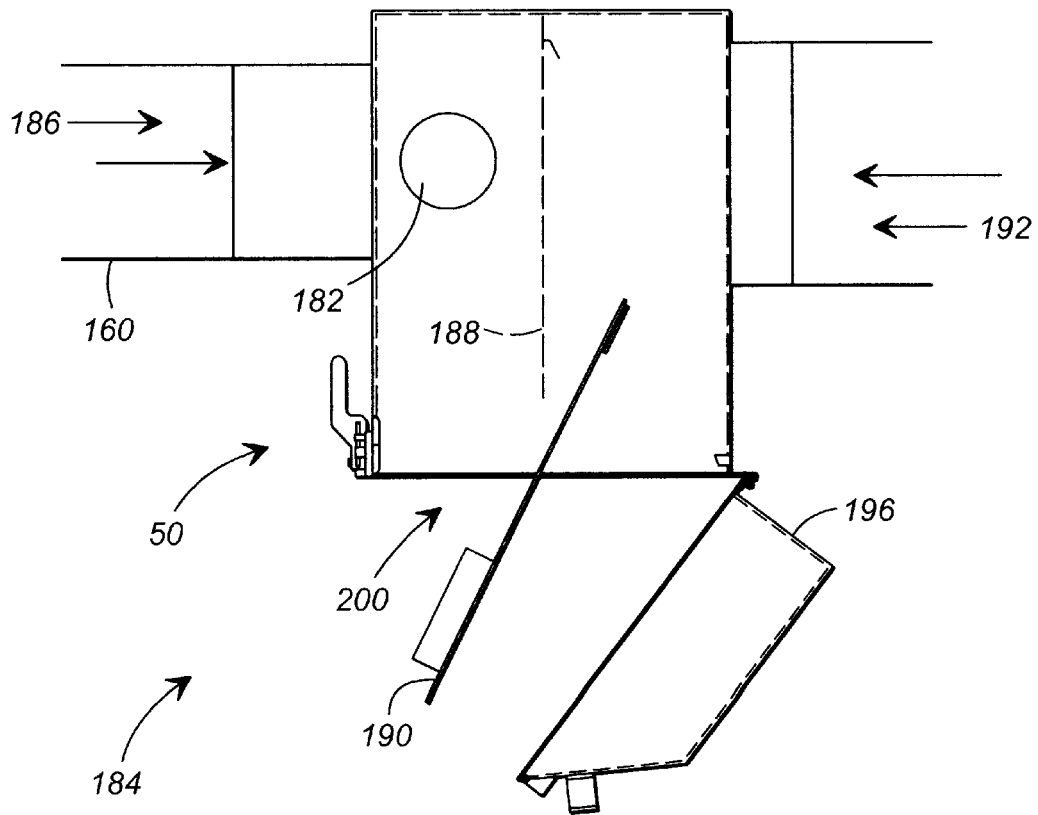
FIG. 20 illustrates a cross-sectional elevation of a dropout box showing detail of the filter cleaning process.
Figure 21:
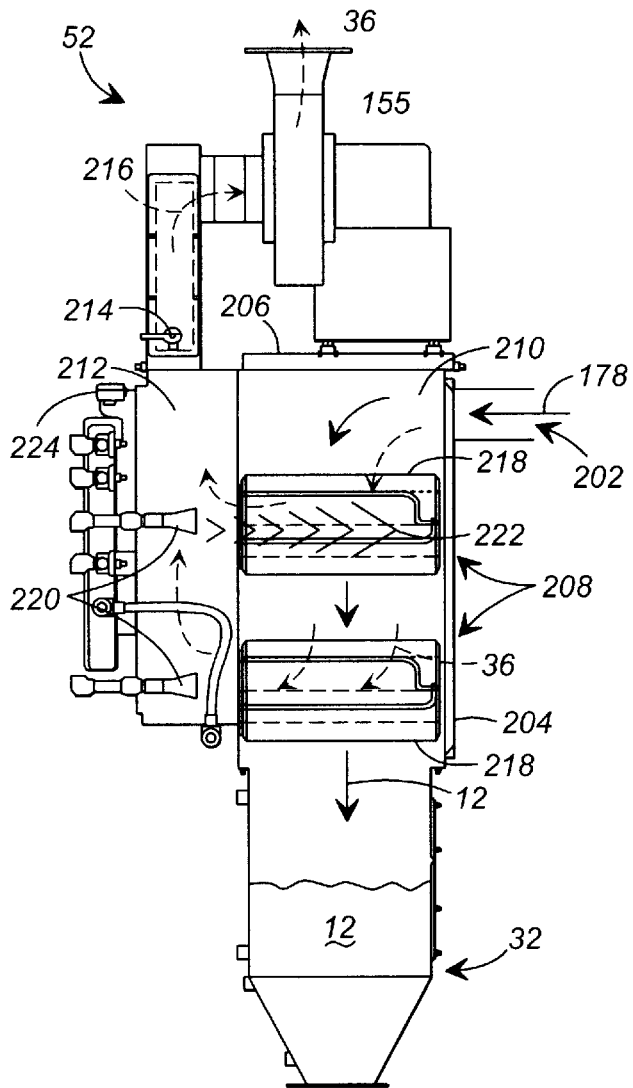
FIG. 21 illustrates a cross-sectional end view of the blower, air-flour separator and hopper.
Figure 22:
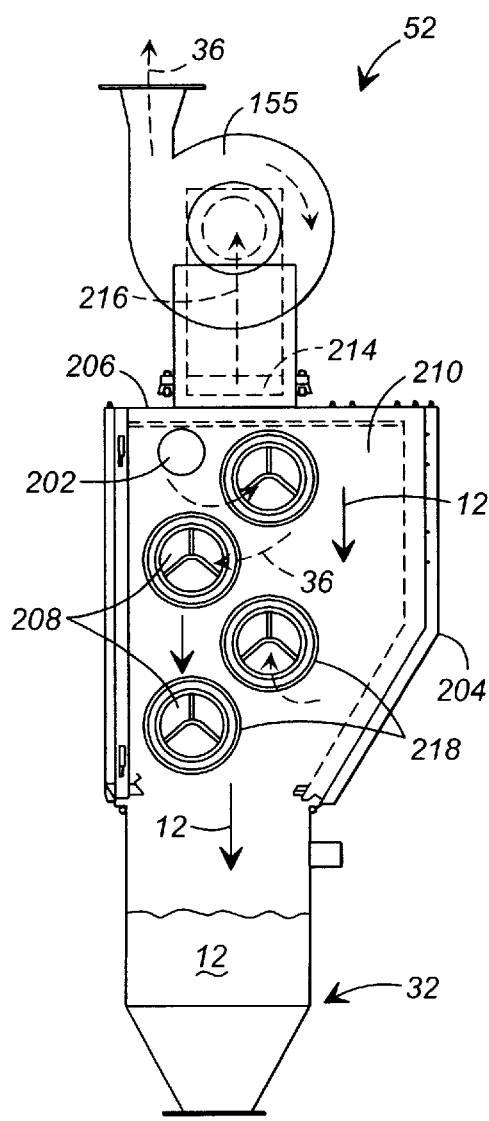
FIG. 22 illustrates a cross-sectional elevation of the blower, air-flour separator and hopper

Additionally, the flow of airborne flour 40 entering the static flow divider 110 can be further homogenized prior to dividing by providing a free spinning fan 127 adapted within the divider 110 and arranged prior to the stationary swirling vanes 112. The flow of airborne flour 40 impinging the fan 127 causes the fan 127 to rotate, thereby dispersing the airborne flour 40 radially about the interior of the divider I 10 In this manner, the flour 12 within the airborne flow of flour 40 is positioned more readily for interaction with the swirling vanes 112 and subsequent division into multiple homogenized flows of flour 40, After exiting a divider 42, each flow of airborne flour 40 is then routed through a network of flow delivery conduit 128 which also functions as delivering means, which transports the airborne flour 40 to an enclosure 130. Enclosure 130 is mounted to a dough processor 132 (FIGS. 12 and 13) which establishes a dough processing path 134 for transporting a dough piece 22 in direction B, which can incorporate a downwardly inclined ramp 136. As shown in FIGS. 14 and 15, the airborne flour 40 enters the enclosure 130 through a series of spray nozzles 44 which are mounted to the enclosure 130 by means of mounting orifices 138 (FIGS. 16 and 17). The spray nozzles 44 direct the flow of airborne flour 40 toward dough pieces 22 which enter the enclosure 130 along the processing path 134 through an inlet 140 and advance down the ramp 136 through adjustable chutes 142 which reorient the dough pieces 22 across the width of the processing path 134. The spray nozzles 44 incorporate an inlet 144 which attaches to delivery conduit 128 and a housing 146 which forms a turbulence 148 of flour in the environment of the dough piece 22 which is confined by the interior surfaces of the enclosure 130 and the processing path 134. In addition to flour 12 adhering to the sticky exterior surface of a passing dough piece 22, the flour 12 also tends to coat the surfaces of any components exposed within the enclosure 130, such as the interior of the enclosure cover 150, side walls 152, the processing path 134 and the ramp 136, due to a static charge which builds up in the flour 12 as the airborne flour 40 passes through the non-conductive delivery conduit 80 and 128. Once the dough piece 22 receives a coating of flour 12 while passing through the enclosure 130 in direction C (FIGS. 14 and 15), the dough piece 22 exits the enclosure 130 through an outlet 154 positioned along the processing path 134.

A collection system 46, which functions as a collector means, is integrated with the enclosure 130 so that the sprayed airborne flour 40 is recaptured within the enclosure 130. This is accomplished by incorporating a main blower 155 which provides a negative air pressure or suction to a collection orifice 156 mounted in a hood 158 placed above, or in some embodiments, below the enclosure 130. The main blower 155 produces a sufficient suction to capture flour 12 that does not adhere to a passing dough piece 22. Since the enclosure 130 is not airtight, a recapture airflow rate of approximately 200 ft/min through each enclosure opening (i.e. inlet 140, outlet 154, etc.) is established to prevent flour 12 and airborne flour 40 from exiting the enclosure 130 at an enclosure opening other than the collection orifice 156. For example, if the enclosure 130 incorporates an inlet 140 with an area of 1 $ft^2$, an outlet 154 with an area of 1 $ft^2$ and miscellaneous openings about the processing path 134 totaling an area of 0.5 $ft^2$, a recapture airflow configured to maintain the flour 12 and airborne flour 40 from exiting the enclosure 130 (e.g. 200 ft/min flow) would require a volumetric flow of 500 $ft^3$/min $((1\ ft^2+1\ ft^2+0.5\ ft^2)\times 200$ ft/min) provided by the main blower 155 to the enclosure 130. Additionally, it is often desirable to provide a sufficient recapture airflow rate to allow for the collection of flour 12 that is situated outside and adjacent an enclosure opening. A recapture airflow rate of approximately 400 ft/min per enclosure opening has been found sufficient to draw the flour 12 into the opening and provide the flour 12 to the collection system 46. Once the unused flour 12 enters the collection orifice 156, the then airborne flour 40 is provided to a series of collection conduit 158 for ultimate return to the flour hopper 32.

The flour application enclosure 130 also can be adapted for use adjacent a segment of surface conveyor 24 which is used to transport a dough piece 22 in direction D (FIG. 18) along a processing path 134. Since the conveyor 24 can be arranged in a substantially horizontal orientation, hanging barrier curtains 162 are adapted to mount to enclosure 130 to retain the flour turbulence 148 within the enclosure 130. In the surface conveyor mounted configuration, the collection orifices 156 are contained within collection funnels 164 mounted to an enclosure bottom 166 below each end of the conveyor 24 so that collection of the unused flour 12 is induced by the suction of the recapture airflow 168 departing the enclosure 130 through the orifices 156 and the tendency of the flour 12 adhering to conveyor belt 170 to fall free of the conveyor 24 as the direction of belt 170 travel is changed when the belt 170 is turned around a conveyor pulley 172 positioned at each end of the conveyor 24 by a motor 174 (not shown). An enclosure door 175 mounted on a side wall 152 of the enclosure 130 allows access to the conveyor 24 and any enclosed components and can provide an additional source of inlet air for adjusting the airflow rates within the enclosure 130 Once the flour 12 enters the collection orifices 156 the recaptured airborne flour 178 is provided to a series of collection conduit 160 for ultimate return to the flour hopper 32.

When the flour 12 in the hopper 32 drops below a predetermined level, the recaptured airborne flour 178 contained within the collection conduit 160 can be augmented by a supply of flour 180 through a flour augment inlet 182 (FIG. 2) positioned between the collection orifices 156 and a filtration system 184. After passing the augment inlet 182 in the collection conduit 160, the recaptured airborne flour 178 enters the filtration system 184 or filter means which includes the drop-out filter box 50, as shown in FIGS. 19 and 20. The drop-out box 50 provides a two step filtering process by forcing the recaptured airborne flour 178 through an inlet 186 and then downwardly and upwardly past a vertically disposed internal barrier wall 188, and then forcing the recaptured airborne flour 178 through a screen filter 190 before exiting the drop-out box outlet 192. When the recaptured airborne flour 178 is forced to change direction around the lower end of the internal barrier wall 188, heavy particles 194 such as small pieces of dough fall out of the air stream and into a particle collection tray 196 mounted at the bottom of the drop-out box 50. The collection tray 196 is hinged so that the tray 196 can be lowered and the particles 194 trapped therein can be removed. Additionally, large particles 198 are filtered from the recaptured airborne flour 178 by the screen filter 190 disposed across the interior of the drop-out box 50. The large particles 198 can also be removed by accessing the screen 190 through the opening 200 formed when the collection tray 196 is lowered and then cleaning the screen 190.

After passing through the screen filter 190 and exiting the drop-out box 50, the recaptured airborne flour 178 passes into an air-flour separator 52 through an inlet 202 where the recaptured airborne flour 178 is segregated into its constituent parts of air 36 and flour 12. As shown in FIGS. 21 and 22, the air-flour separator 52, which functions as a separator means, includes side walls 204 and a top 206 and is positioned above the hopper 32. After entering through the inlet 202, the recaptured airborne flour 178 interacts with a plurality of cartridge filters 208 mounted to side walls 204 and horizontally disposed across the interior 210 of the separator 52 such that the air 36 from the recaptured airborne flour 178 is drawn in through the filters 208 and into a clean air chamber 212 while the filters 208 prohibit the flour 12 from the recaptured airborne flour 178 from entering the chamber 212. The separated air 36 departs the separator 52 through a damper 214, which can adjust the flow rate of the departing air 36, and is then provided to the main blower 155 as inlet air and vented to atmosphere from blower 155.

It should be noted that drawing the air 36 from the separator 52 creates a partial vacuum 78 within the interior 210 of the separator 52 as well as the interior of the hopper 32 which should be maintained to facilitate an efficient air-flour separation process, therefore, the type of transfer assembly 54 used to remove flour 12 from the hopper 32 should be adapted to maintain the partial vacuum 78 during operation. Additionally, the separated flour 12 which is prevented from entering the cartridge filters 208 can fall to the hopper 32 which is disposed therebelow, thereby allowing the separator 52 to function as a flour delivery means. However, some of the separated flour 12 can tend to build up on the exterior surface 218 of a cartridge filter 208 due to the air 36 flowing through the filter 208. To prevent the flour 12 which builds up on the exterior surface 218 from forming a layer of flour 12 that is thick enough to restrict air flow into the filter 208 (i.e. flour thickness of one to two inches), each filter 208 incorporates an air cannon 220 arranged within the clean air chamber 212 and directed toward the interior of the filter 208 to periodically discharge a blast of pressurized air 222 in order to force the retained flour 12 from the exterior surface 218 of each filter 208. The cannons 220 are fired sequentially into the filters 208 by means of a firing timer 224 starting with the upper most filter 208 in the separator 52 and then firing in order through each next lowest filter 208. The cannon firing sequence initiated by the firing timer 224 allows the flour 12 dislodged from a higher oriented filter 208 to fall lower in the separator 52 without becoming lodged on the exterior surface 170 of a recently cleaned lower oriented filter 208. Once the flour 12 is dislodged and falls free of all the cartridge filters 208, the flour 12 falls into the hopper 32 disposed therebelow and can be reused in the flour application process.

The auxiliary blower 38 typically draws air 36 from the atmosphere in order to provide a sufficient flow of air 36 to the aerator 34. However, in an alternative embodiment of the present invention, the blower 38 can draw air 36 from the interior 210 of the air-flour separator 52. In this configuration, the blower 38 provides substantially the same volume of air 36 to the enclosure 130 as the blower 38 draws from the air-flour separator 52, thereby reducing the suction that main blower 155 needs to provide to the interior 210 of the air-flour separator 52 in order to facilitate separation of the air 36 and flour 12.

The foregoing description has been presented for purposes of illustration and description. It is not intended to be exhaustive or to limit the invention to the precise forms disclosed. Obvious modifications or variations are possible in light of the above teachings. Specifically, it is contemplated that the present invention is well suited for uses incorporating a network of processing systems linked together such that a limited number of flour supply and collection systems cooperate with a plurality of enclosures. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A flour applicator for applying flour to bakery dough pieces as the dough pieces move along a processing path, comprising:

a hopper for providing a supply of flour;

an open ended enclosure for positioning along a dough piece processing path, said enclosure including a dough piece inlet opening and a dough piece outlet opening for extending along a processing path for passing dough pieces through said enclosure, and internal surfaces arranged to be contacted by and to guide dough pieces to pass from said dough piece inlet opening through said enclosure to said dough piece outlet opening; and an air flow system arranged to draw flour from said hopper and to transmit airborne flour to said enclosure and apply a turbulence of airborne flour to dough pieces moving through said enclosure and to the surfaces of said enclosure contacted by the dough pieces and to draw airborne flour from said enclosure and return airborne flour to said hopper;

so that flour is coated onto the exterior surfaces of dough pieces moving through said open ended enclosure.

2. The flour applicator of claim 1, wherein said internal surfaces of said open ended enclosure include a surface conveyor extending through said open ended enclosure for moving dough pieces along the processing path as flour is applied to the dough pieces.

3. The flour applicator of claim 2, wherein said surface conveyor is arranged to move the dough pieces along an incline as the flour is being coated onto the exterior surfaces of the dough pieces.

4. The flour applicator of claim 1, wherein said air flow system is arranged to draw a reduced pressure in said open ended enclosure for preventing escape of airborne flour from said open ended enclosure.

5. The flour applicator of claim 1, wherein said internal surfaces of said open ended enclosure include an inclined ramp extending through said open ended enclosure for rolling dough pieces down the ramp under the influence of gravity, and nozzles positioned to apply a turbulence of airborne flour about the dough pieces as the dough pieces roll down the ramp.

6. The flour applicator of claim 1, further including curtains releasably closing said openings for retarding the movement of airborne flour from inside to outside said enclosure and arranged to pass dough pieces through said enclosure.

7. The flour applicator of claim 1, wherein said hopper includes feed means for dispensing a substantially constant volume of flour, and said air circulation means includes a blower arranged to continuously convey flour dispensed from said hopper to said enclosure.

8. A flour applicator for applying flour to bakery dough pieces as the dough pieces move along a processing path, comprising:

a hopper for providing a supply of flour;

an open ended enclosure for positioning along a dough piece processing path, said enclosure including a dough piece inlet opening and a dough piece outlet opening for extending along a processing path for passing dough pieces through said enclosure, and internal surfaces arranged to be contacted by and to guide dough pieces to pass from said dough piece inlet opening through said enclosure to said dough piece outlet opening;

an air flow system arranged to draw flour from said hopper and to transmit airborne flour from said hopper to said enclosure and apply flour to dough pieces moving through said enclosure and to the surfaces of said enclosure contacted by the dough pieces; and means for generating static electricity in the flour transmitted to said enclosure;

so that flour is coated onto the exterior surfaces of dough pieces moving through said open ended enclosure.

9. A flour applicator for applying flour to dough pieces moving along a processing path, comprising:

a hopper for storing flour;

an open ended enclosure for straddling a processing path having openings at its opposite ends for passing dough pieces therethrough; and an air circulating system communicating with said hopper and said enclosure and arranged to draw flour from said hopper and deliver airborne flour from said hopper to said enclosure and form a turbulence of airborne flour in said enclosure about the dough pieces moving along the processing path and draw flour from said open ended enclosure and return flour to said hopper.

10. The flour applicator of claim 9, wherein said air circulating system includes nozzles positioned in said enclosure for directing turbulent air and flour toward dough pieces moving through said enclosure.

11. The flour applicator of claim 10, wherein said enclosure includes internal surfaces for engaging and guiding dough pieces through said enclosure, said nozzles arranged to direct flour toward said internal surfaces.

12. The flour applicator of claim 10, wherein said nozzles include a plurality of nozzles directed in different directions for applying flour to different surfaces of dough pieces.

13. A method of applying flour to bakery dough pieces moving along a processing path, comprising:

forming an open ended enclosure about a processing path;

moving the dough pieces in sequence along the processing path through the enclosure;

entraining flour from a supply of flour in a stream of air;

delivering the flour entrained in the stream of air into the enclosure and about the dough pieces moving through said enclosure;

forming a turbulence of air and flour with the stream of air and flour inside the enclosure and about the dough pieces as the dough pieces move through said enclosure;

coating the dough pieces with the flour from the turbulence of flour; and returning flour not coated on the dough pieces with the stream of air to the supply of flour.

14. A method of applying flour to bakery dough pieces moving along a processing path, comprising:

moving dough pieces along a processing path;

forming an open ended enclosure about the processing path;

entraining flour from a supply of flour in a stream of air;

delivering the flour entrained in the stream of air into the enclosure;

generating static electricity in the flour as the flour is delivered into the enclosure, and forming a turbulence of air and flour with the stream of air and flour inside the enclosure and about the dough pieces.

15. The method of claim 13, and wherein the step of entraining flour in a stream of air comprises dispensing flour from the supply of flour into the stream of air.

16. The method of claim 15, wherein the step of delivering flour entrained in a stream of air into the enclosure comprises directing a stream of flour and air in different directions toward the dough pieces as the dough pieces move through the enclosure.

17. The method of claim 15, and further including retarding the flow of air and flour out of the open ends of the enclosure while passing dough pieces through the open ends of the enclosure.

18. The method of claim 17, wherein the step of retarding the flow of air and flour out of the open ends of the enclosure comprises drawing reduced air pressure in the enclosure.

19. The method of claim 17, wherein the step of retarding the flow of air and flour out of the open ends of the enclosure comprises releasably closing the open ends of the enclosure with curtains.

20. A method of applying flour to dough pieces in a continuous dough processing system comprising the steps of:

moving dough pieces in series in a column onto a conveyor surface and through an open ended housing;

directing a stream of air into and out of the housing;

moving flour from a supply of flour into the stream of air so that the flour becomes airborne in the stream of air and enters the housing;

as the dough pieces move through the housing applying the airborne flour to the dough pieces and to the surface conveyor in an air and flour turbulence about the dough pieces in the housing until all of the exposed surfaces of the dough pieces are coated with flour;

moving the dough pieces out of the housing; and recirculating flour left in the housing back to the supply of flour.

21. The method of claim 20 and wherein the conveyor surface is an inclined stationary surface, and the step of applying the airborne flour to the dough pieces and to the surface conveyor includes coating the surface conveyor with flour, and the step of moving dough pieces on the conveyor surface comprises rolling the dough pieces down the inclined conveyor surface.

22. The method of claim 20 and wherein the step of recirculating the flour left in the housing back into the supply of flour comprises drawing air and flour from said housing.

23. The method of claim 20 and further including the step of maintaining an air pressure less than atmospheric air pressure in the housing.

24. The method of claim 20 and wherein said open ended housing includes an entrance opening and an exit opening, and curtain means closing said exit opening, and wherein the step of moving dough pieces out of the housing comprises moving the dough pieces through said curtain means.

25. The method of claim 20 and wherein the step of moving the dough pieces in series in a column comprises moving the dough pieces in a plurality of parallel columns through a substantially closed housing.

26. Apparatus for applying flour to dough pieces in a continuous dough processing system comprising:

a conveyor surface having an entrance end and a discharge end arranged to move a series of dough pieces in a column from said entrance end to said discharge end;

a housing extending about said conveyor surface and defining an entrance opening at the entrance end of said conveyor surface and a discharge opening about said discharge end;

a supply of flour;

flour-induction means extending from said supply of flour to said housing for inducing a turbulent flow of air and flour from said supply of flour and within said housing about the dough pieces in the housing; and recirculating means in communication with said housing for moving flour and air from said housing and delivering flour to said supply of flour;

whereby the flour in the turbulent flow of flour and air is uniformly applied to the exposed surfaces of the dough pieces as the dough pieces move through the housing.

* * * * *